United States Patent
Manlick et al.

(10) Patent No.: US 9,421,921 B2
(45) Date of Patent: Aug. 23, 2016

(54) MULTI-PURPOSE SECONDARY TRUCK BED

(71) Applicants: Terry Manlick, Green Bay, WI (US); Rick Manlick, Green Bay, WI (US)

(72) Inventors: Terry Manlick, Green Bay, WI (US); Rick Manlick, Green Bay, WI (US)

(*) Notice: Subject to any disclaimer, the term of this patent is extended or adjusted under 35 U.S.C. 154(b) by 0 days.

(21) Appl. No.: 14/788,933

(22) Filed: Jul. 1, 2015

(65) Prior Publication Data
US 2016/0001825 A1 Jan. 7, 2016

Related U.S. Application Data

(60) Provisional application No. 62/020,265, filed on Jul. 2, 2014.

(51) Int. Cl.
*B60R 13/01* (2006.01)

(52) U.S. Cl.
CPC ..................... *B60R 13/01* (2013.01)

(58) Field of Classification Search
CPC ............. B60P 1/003; B60P 3/40; B60P 3/14; B60R 5/04; B60R 11/00; B60R 13/01
USPC ............. 224/402, 403, 405; 296/26.09, 26.12
See application file for complete search history.

(56) References Cited

U.S. PATENT DOCUMENTS

| | | | |
|---|---|---|---|
| 4,475,760 A | 10/1984 | Morgan | |
| 4,824,158 A * | 4/1989 | Peters | B60R 5/04 108/44 |
| 4,951,991 A | 8/1990 | Haigler | |
| 4,993,088 A * | 2/1991 | Chudik | B60R 5/04 108/44 |
| 5,064,335 A * | 11/1991 | Bergeron | B60P 1/003 211/151 |
| 5,090,335 A * | 2/1992 | Russell | B60P 1/433 108/44 |
| 5,423,587 A * | 6/1995 | Ingram | B60P 3/32 135/88.13 |
| 5,741,038 A | 4/1998 | Fowler et al. | |
| 5,924,835 A * | 7/1999 | Ross | B60P 3/06 224/402 |
| 5,944,371 A * | 8/1999 | Steiner | B60R 5/04 296/187.11 |
| 6,244,646 B1 * | 6/2001 | Wheeler, III | B60P 3/14 296/26.01 |
| 6,752,301 B1 * | 6/2004 | Drolet | B60P 3/40 224/403 |
| 6,834,902 B2 * | 12/2004 | Agan | B60P 3/40 224/405 |
| 6,860,536 B1 * | 3/2005 | Schimunek | B60P 1/003 296/26.09 |
| 6,866,316 B1 * | 3/2005 | Harder | B60R 11/00 248/300 |
| 6,921,120 B1 * | 7/2005 | Ervin | B60P 3/40 296/26.02 |
| 7,488,027 B2 * | 2/2009 | Liao | B60J 7/1621 296/100.06 |
| 7,530,618 B2 * | 5/2009 | Collins | B60P 1/003 224/403 |
| 7,543,873 B1 * | 6/2009 | Thornsberry | B60P 1/003 224/403 |
| 7,798,074 B2 * | 9/2010 | Kashihara | B65D 90/14 108/51.11 |
| 8,007,024 B2 * | 8/2011 | Kealy | B60J 7/1614 296/100.02 |
| 8,496,281 B2 | 7/2013 | Thygesen | |
| 2007/0007785 A1 * | 1/2007 | Thygesen | B60R 9/00 296/37.1 |
| 2007/0210599 A1 * | 9/2007 | Arnold | B60P 1/003 296/26.09 |
| 2008/0136206 A1 * | 6/2008 | McKelvey | B60P 1/003 296/26.09 |
| 2009/0026785 A1 * | 1/2009 | Nolan | B60P 1/4421 296/26.09 |
| 2009/0309380 A1 * | 12/2009 | Stackpole | B62D 33/0273 296/26.09 |
| 2010/0283279 A1 * | 11/2010 | Suzuki | B60R 5/041 296/26.09 |
| 2011/0062736 A1 * | 3/2011 | Skoglun | B62D 33/02 296/26.02 |

\* cited by examiner

*Primary Examiner* — Peter Helvey
(74) *Attorney, Agent, or Firm* — Absolute Technology Law Group, LLC

(57) ABSTRACT

The present invention is a multi-purpose secondary truck bed. An inner leaf assembly slides along or within an outer leaf assembly, permitting adjustment of the overall length of the secondary truck bed. The inner leaf and outer leaf assemblies also slide up and down legs, allowing height adjustment for the inner leaf and outer leaf assemblies. Fasteners passed through fastening apertures in lateral edges of the inner leaf and the outer leaf maintain the length. Fasteners passed through fastening apertures in the legs and the inner leaf and outer leaf assemblies maintain the height.

20 Claims, 24 Drawing Sheets

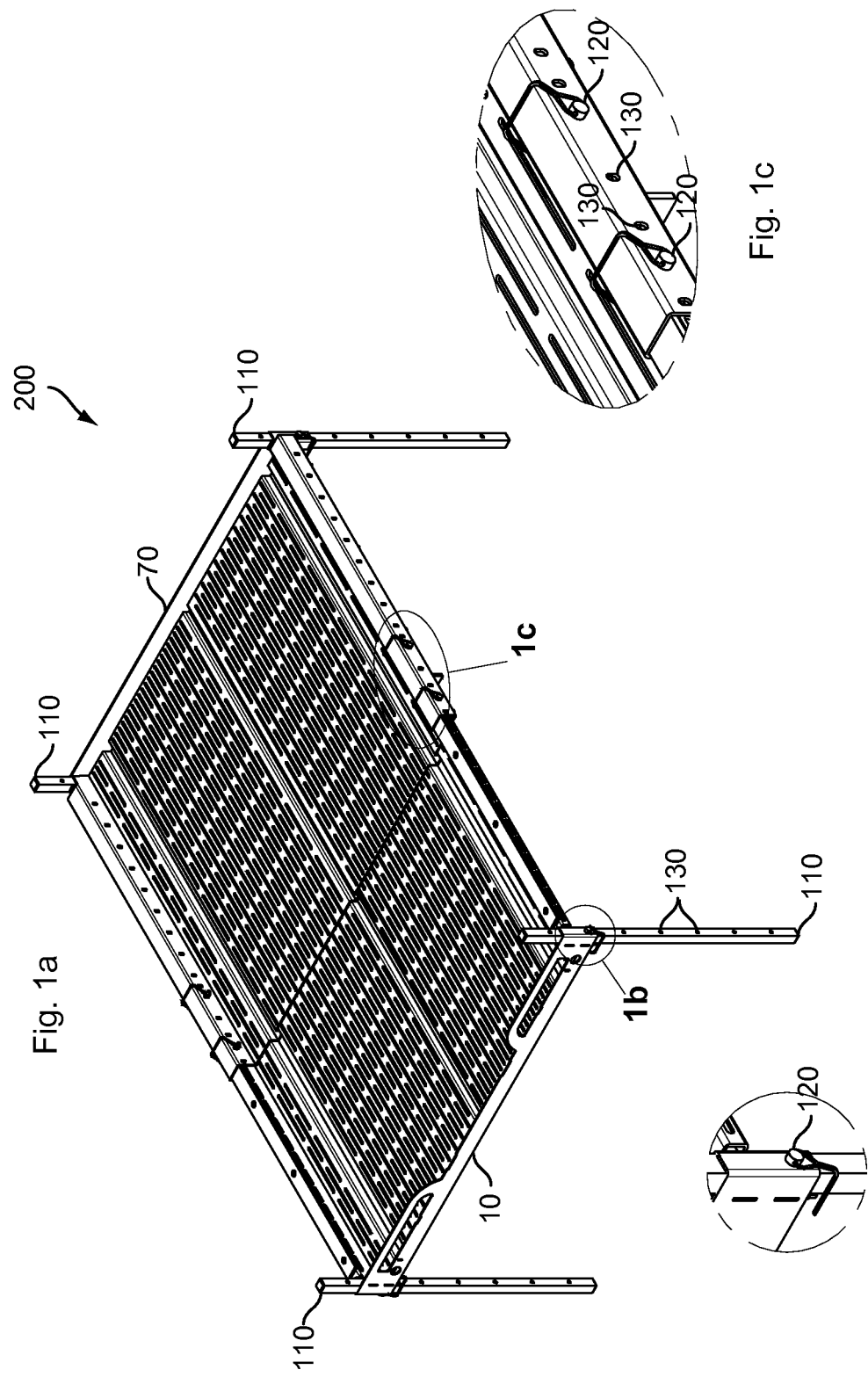

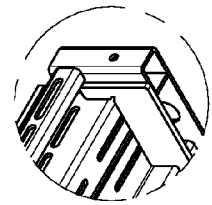
Fig. 2f
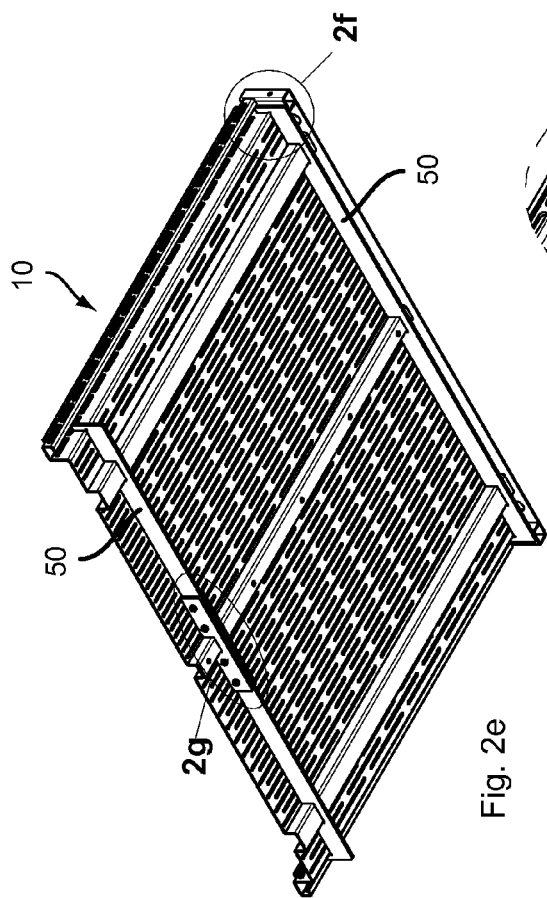
Fig. 2e
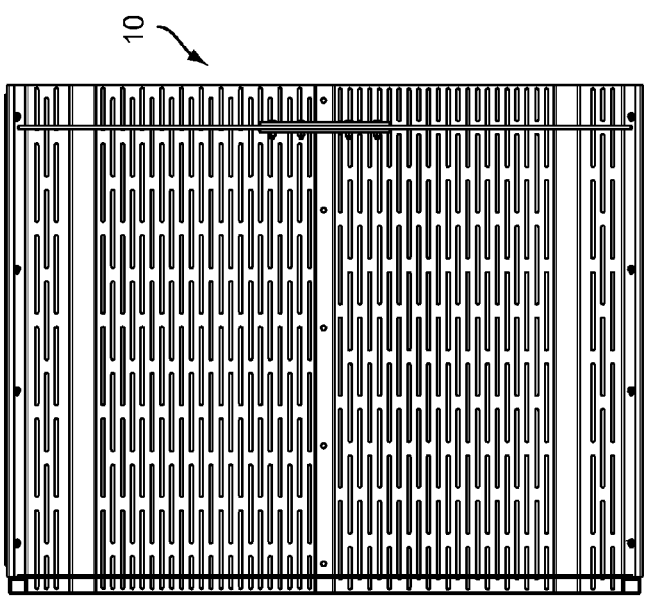
Fig. 2g
Fig. 2d

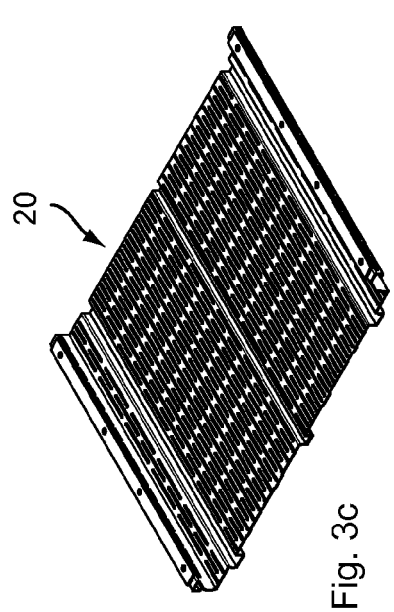
Fig. 3c
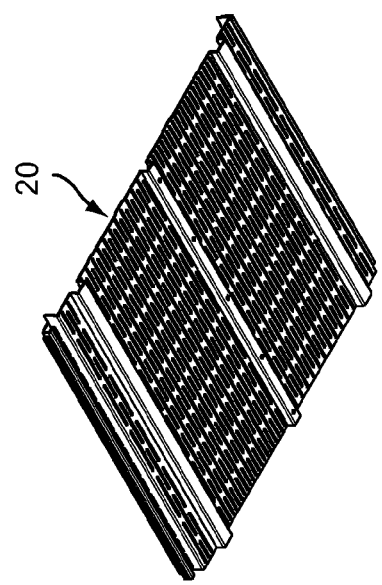
Fig. 3d
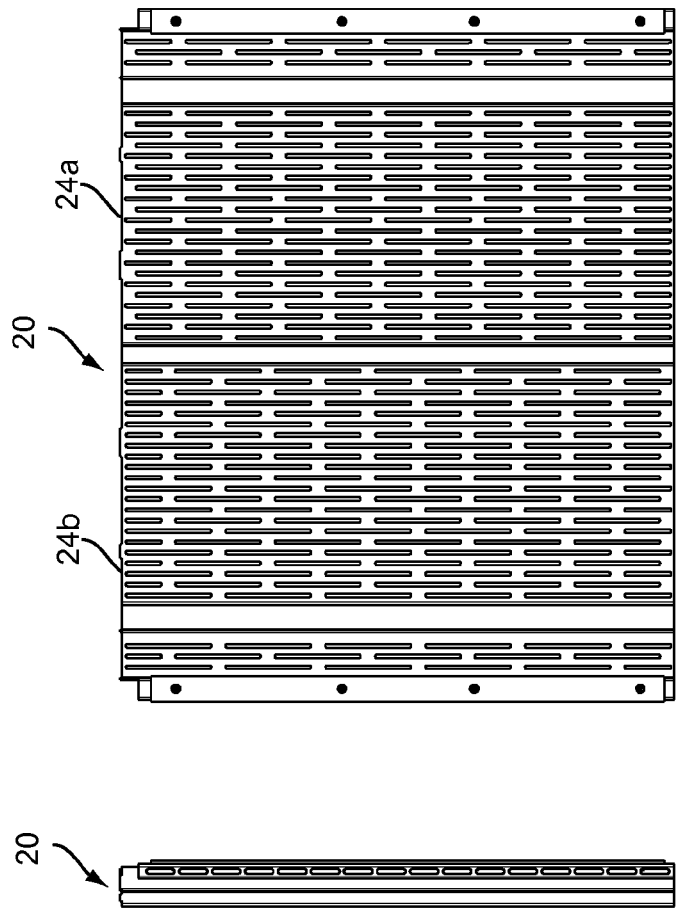
Fig. 3b
Fig. 3a

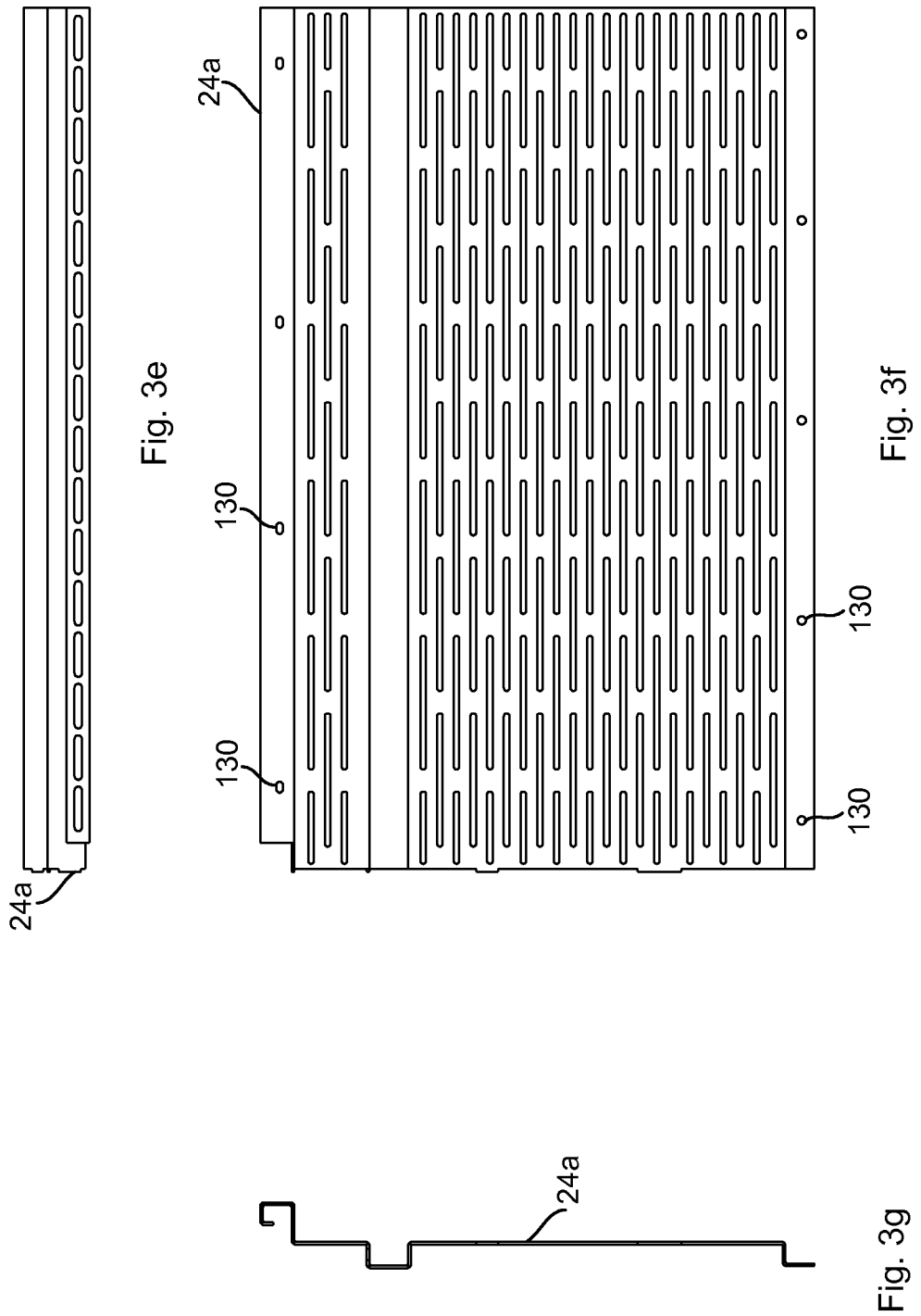

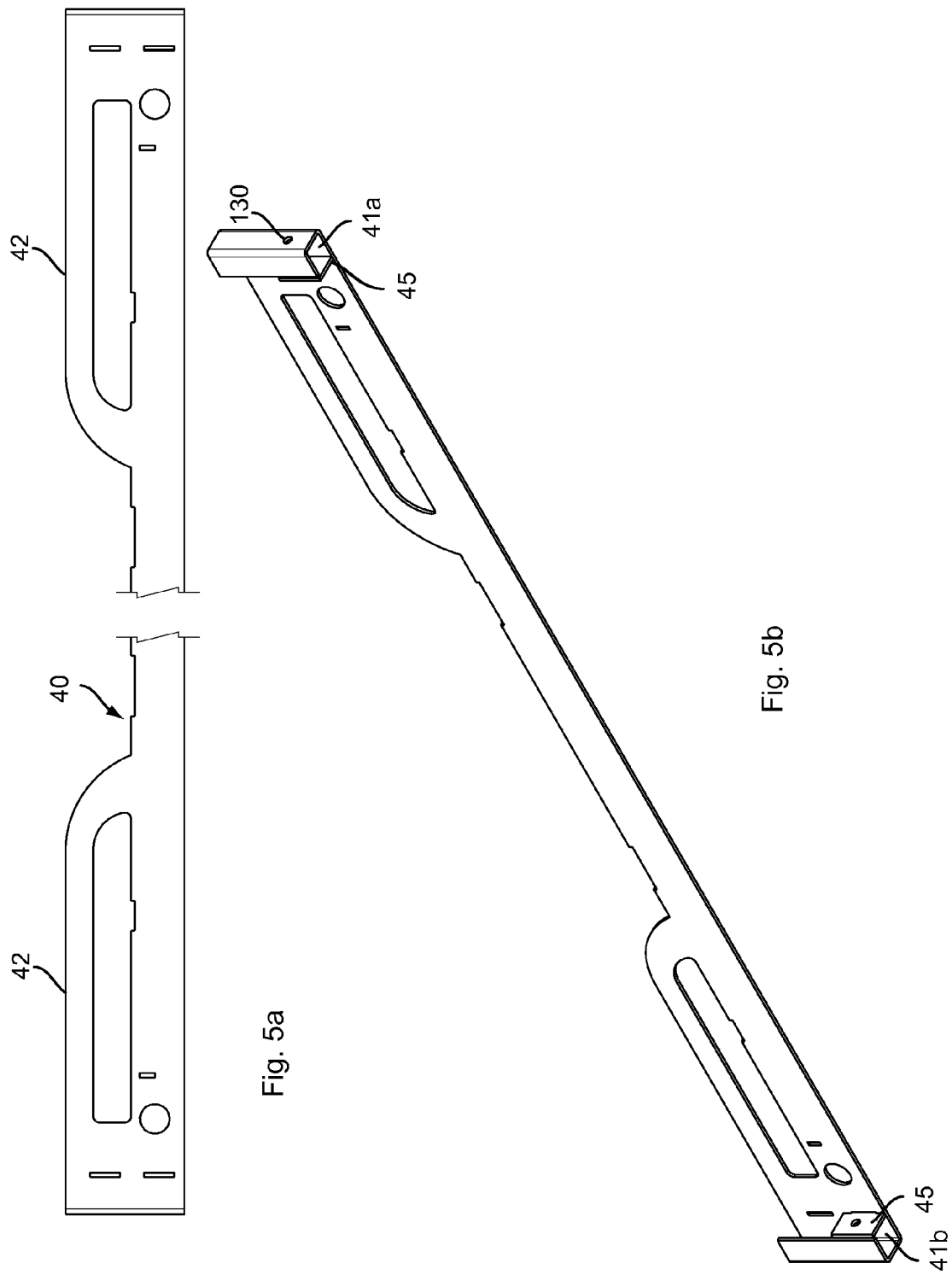

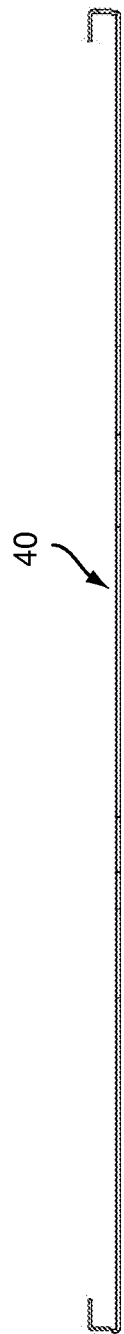
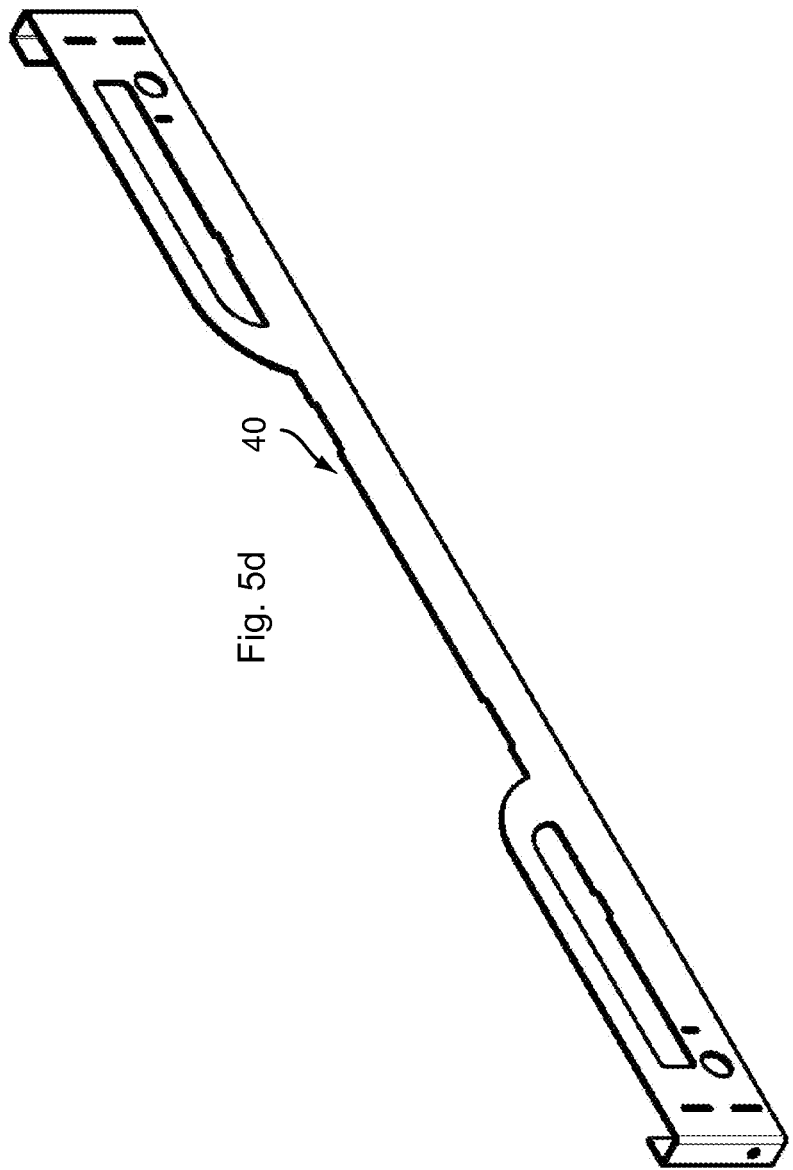
Fig. 5c
Fig. 5d

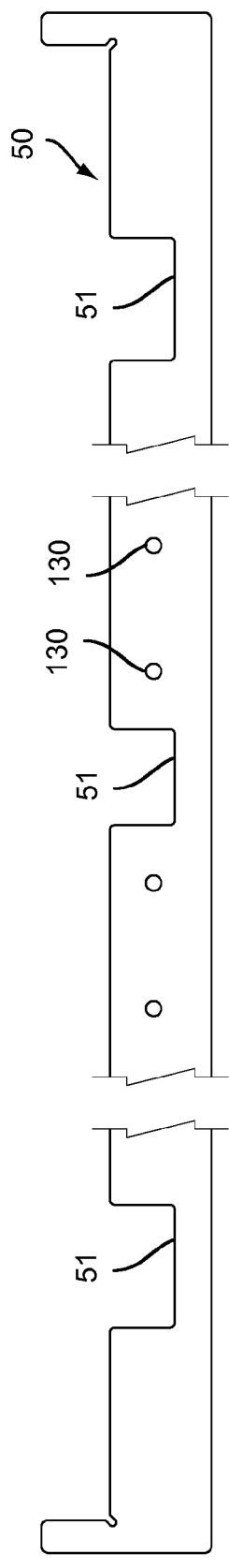
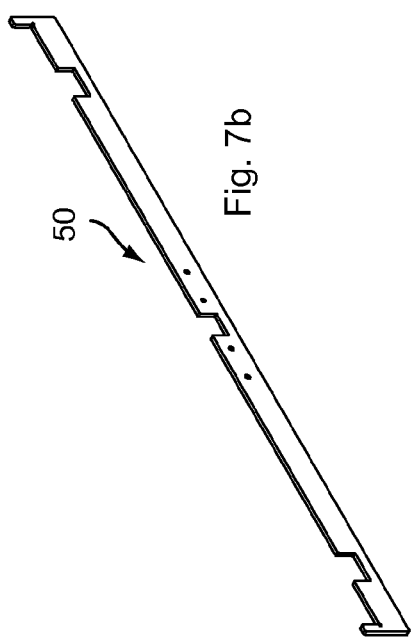

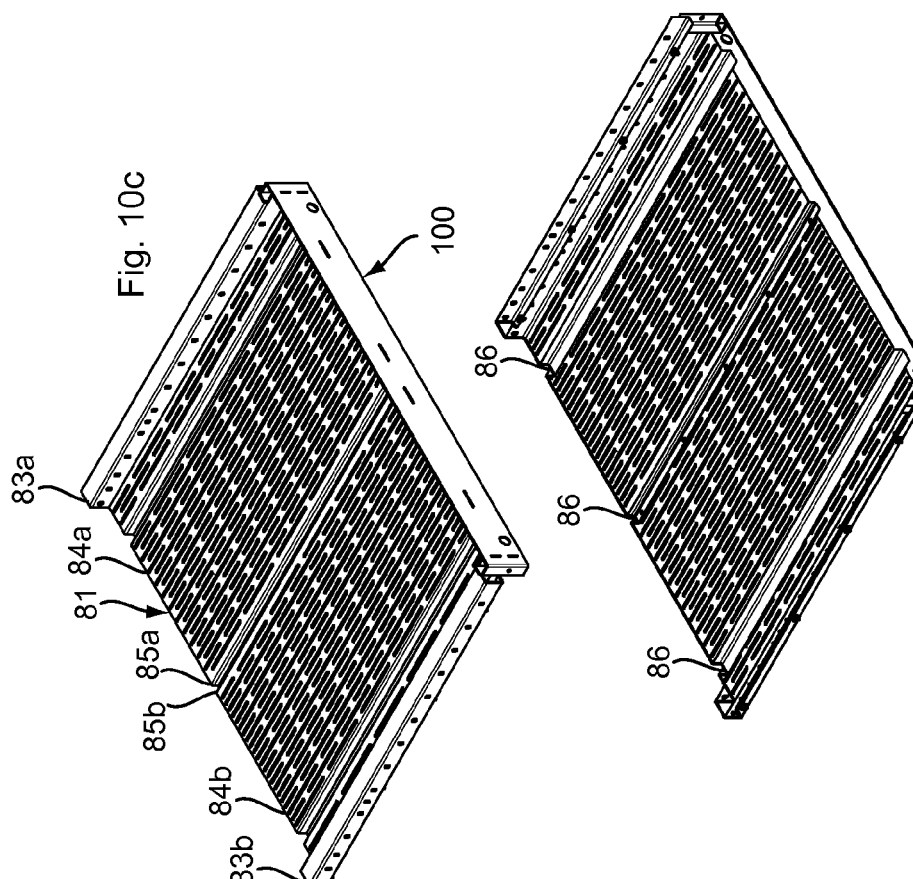
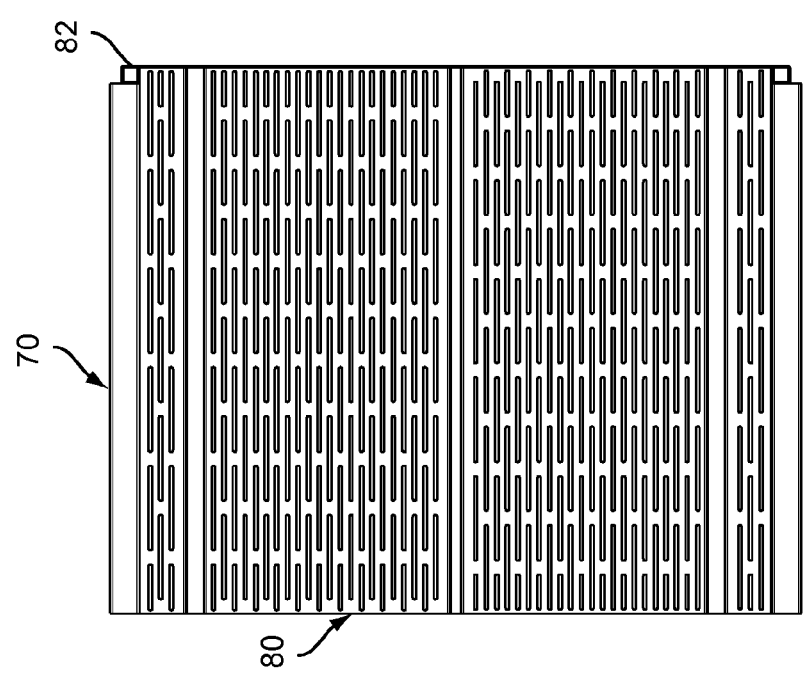

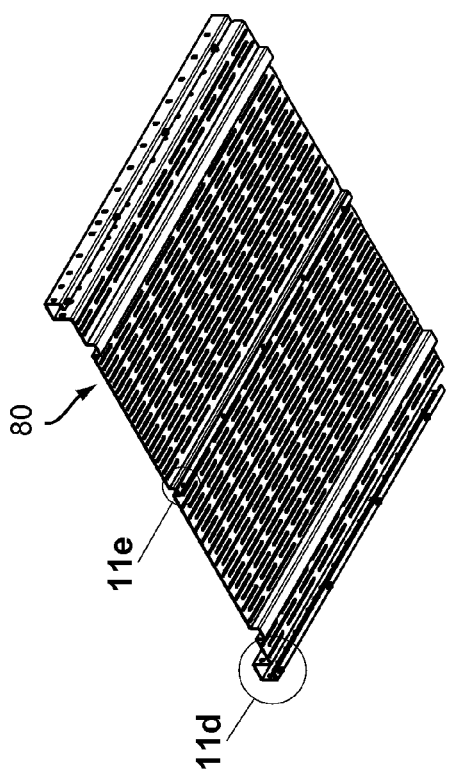
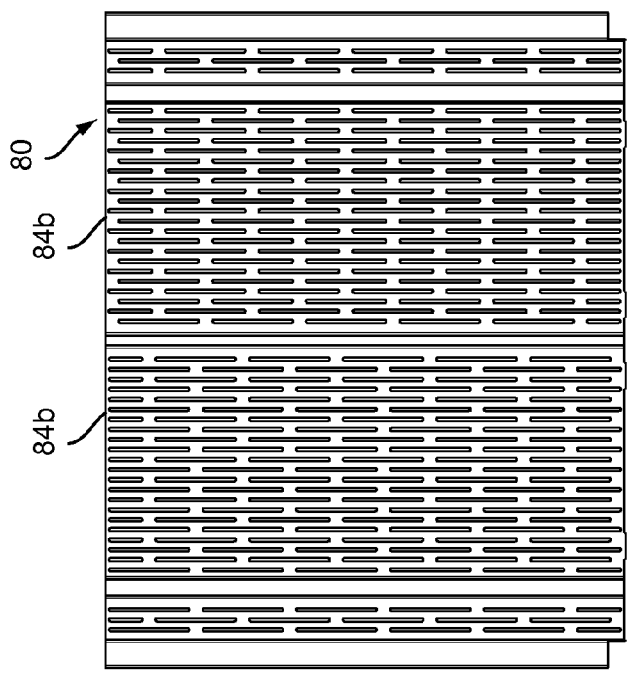
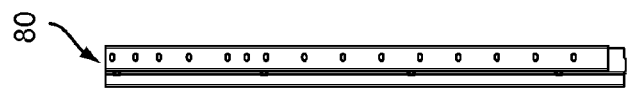
Fig. 11c
Fig. 11e
Fig. 11d
Fig. 11b
Fig. 11a

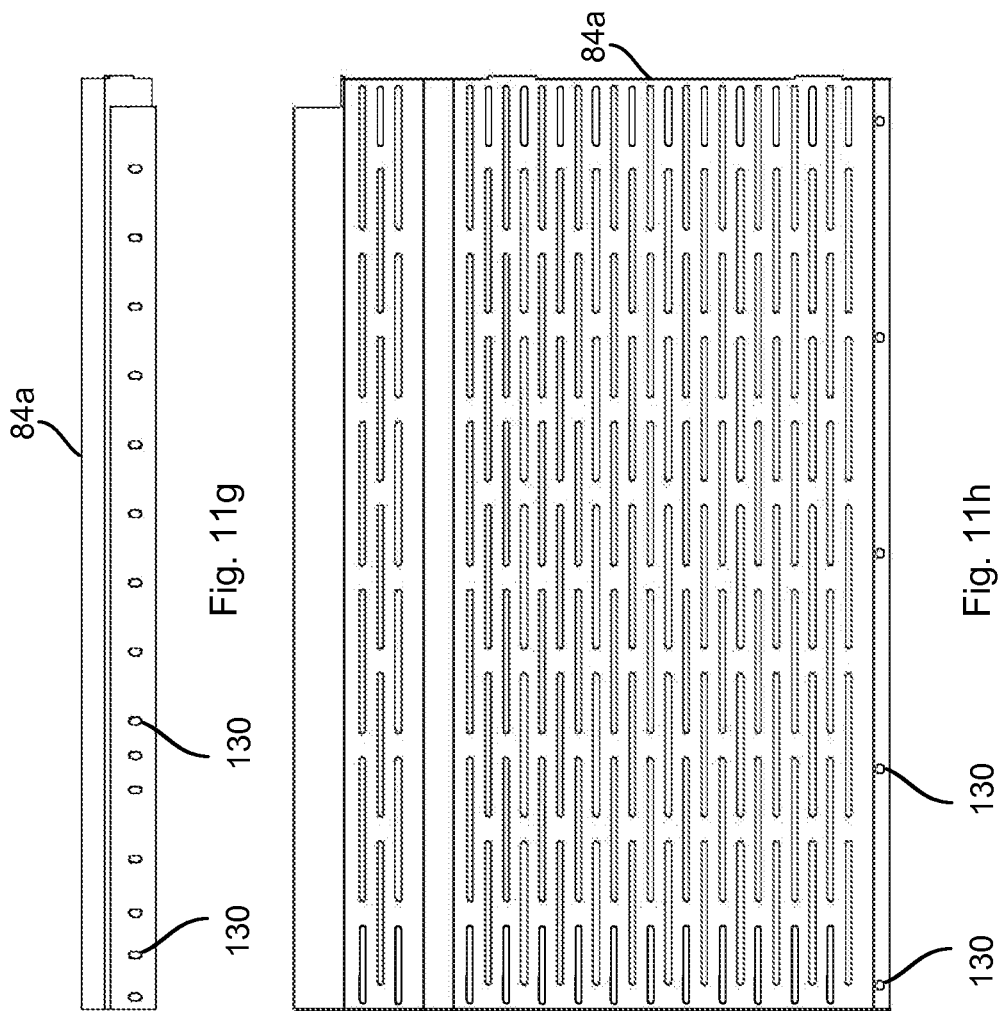
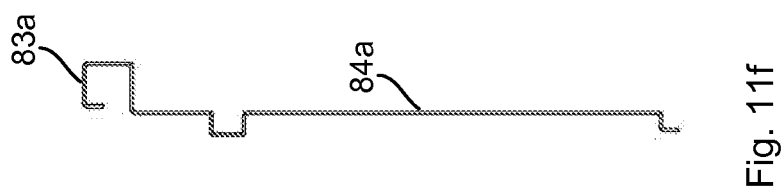

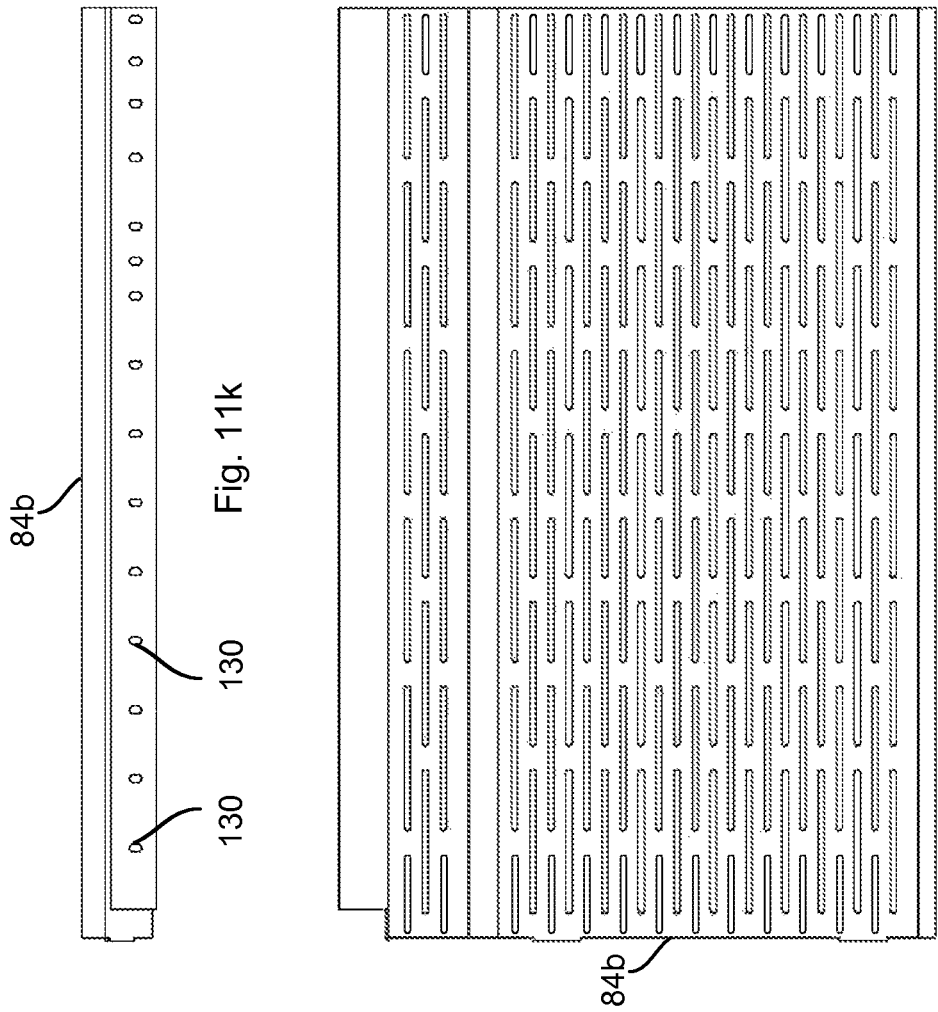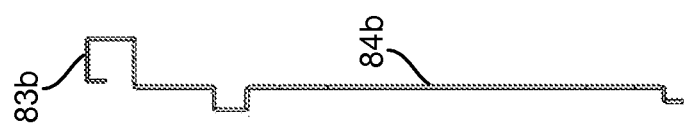

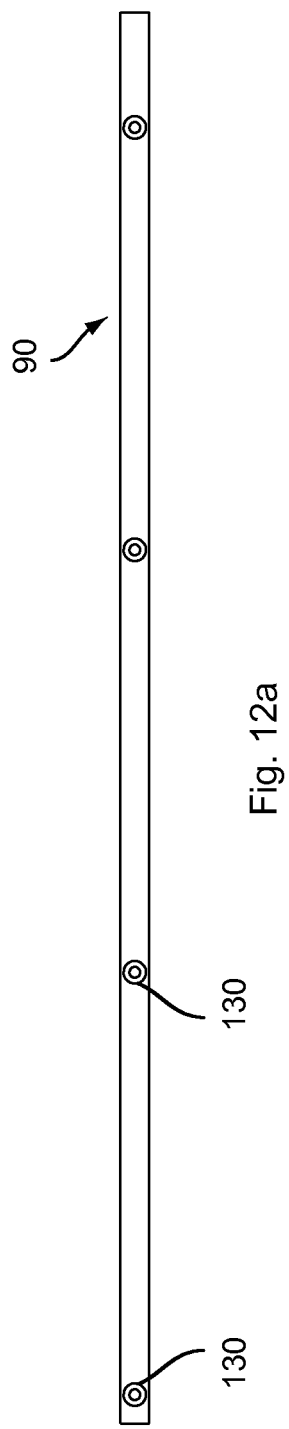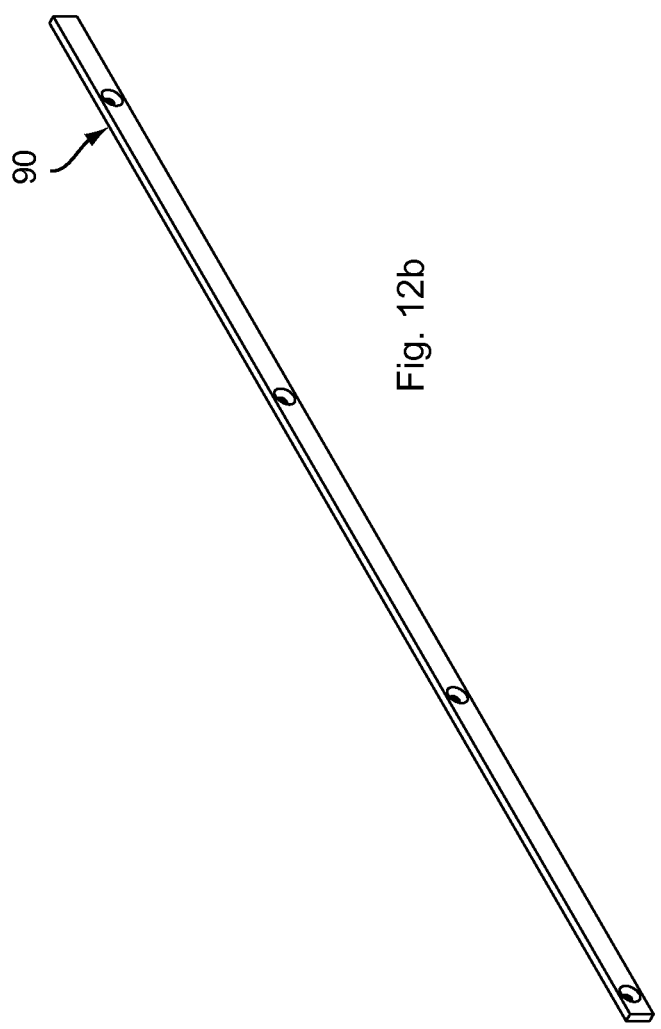

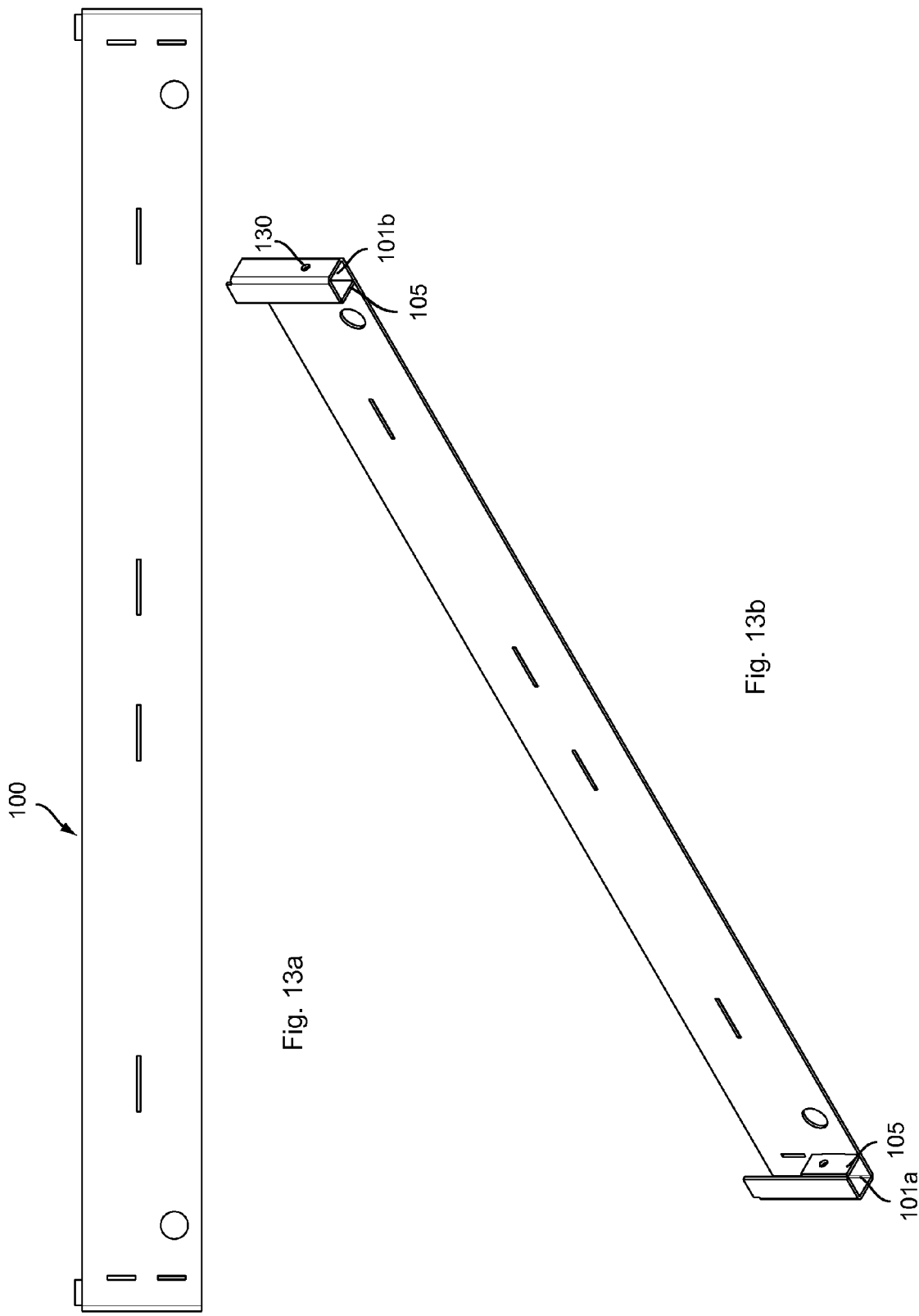

MULTI-PURPOSE SECONDARY TRUCK BED

CROSS-REFERENCE TO RELATED APPLICATIONS

This patent application claims the benefit of U.S. Provisional Application No. 62/020,265 filed Jul. 2, 2014. The above application is incorporated by reference herein in its entirety.

BACKGROUND OF THE INVENTION

1. Field of Invention

This invention relates to the field of motor vehicles, and more specifically to a removable, multi-purpose, removable secondary truck bed.

2. Description of Related Art

Truck secondary beds are fixed decks or a fixed deck with drawers. These decks allow efficient use of truck bed space by allowing multiple levels of storage. This permits users to stack multiple levels of smaller items, such as construction materials like pipes or toolboxes, without the items becoming damaged or disorganized.

Prior art secondary beds are permanently installed by bolting them to the truck structure. Many of these beds are heavy and specifically manufactured to the dimensions of a particular truck make and model. They are not easily removed from the truck and have no utility outside of the truck. Once removed, the prior art beds cannot be reused in a truck bed having different dimensions from the original installation. If the new truck has a shorter bed or lower roof, then the secondary truck bed will not fit. If the new truck has a longer bed or higher roof, then the secondary truck bed will not make efficient use of the space.

There is an unmet need in the art for secondary beds capable of adjustment to multiple trucks sizes.

There is a further unmet need in the art for secondary beds that have utility outside of the truck.

BRIEF SUMMARY OF THE INVENTION

The present invention is a secondary truck bed system including an inner leaf assembly, an outer leaf assembly, a plurality of legs and a plurality of removable fasteners. The inner leaf assembly includes an inner leaf having an inner leaf front edge, an inner leaf back edge and a plurality of inner leaf lateral edges. Each of the inner leaf lateral edges has at least one fastening aperture. A plurality of inner leaf rails connect to the plurality of inner leaf lateral edges. A front support connects to the inner leaf front edge. The front support has a plurality of front leg channels. Each of the front leg channels has at least one fastening aperture. The outer leaf assembly includes an outer leaf having an outer leaf front edge, an outer leaf back edge and a plurality of outer leaf lateral edges. Each of the outer leaf lateral edges has at least one fastening aperture. A plurality of outer leaf rails connect to the plurality of outer leaf lateral edges. A rear support connects to the outer leaf back edge. The rear support has a plurality of rear leg channels. Each of the rear leg channels has at least one fastening aperture. Each of the plurality of legs includes a plurality of paired fastening apertures. The plurality of outer leaf lateral edges are slidably connected to the plurality of inner leaf lateral edges. At least one of the plurality of removable fasteners extends through the fastening aperture in the plurality of inner leaf lateral edges and through the fastening aperture in the plurality of outer leaf lateral edges. Each of the plurality of front leg channels are slidably connected to one of the plurality of legs. Each of the plurality of rear leg channels are slidably connected to one of the plurality of legs. At least one of the plurality of removable fasteners extends through the fastening aperture in each of the plurality of front leg channels and through two of the plurality of paired fastening apertures in one of the plurality of legs. At least one of the plurality of removable fasteners extends through the fastening aperture in each of the plurality of front leg channels and through two of the plurality of paired fastening apertures in one of the plurality of legs.

BRIEF DESCRIPTION OF SEVERAL VIEWS OF THE DRAWING(S)

FIGS. 1a-1c illustrate perspective and enlarged views of an exemplary embodiment of a secondary truck bed system.

FIGS. 2a-2g illustrate front, top, top perspective, bottom, bottom perspective and enlarged views, respectively, of an exemplary embodiment of an inner leaf assembly.

FIGS. 3a-3j illustrate side, top, top perspective, partial top perspective, side, partial top, partial front, side, partial top and partial front views, respectively, of an exemplary embodiment of an inner leaf.

FIGS. 5a-5d illustrate front, back perspective, top, front perspective and enlarged views, respectively, of an exemplary embodiment of a front support.

FIGS. 7a and 7b illustrate front and perspective views, respectively, of an exemplary embodiment of an inner leaf cross member.

FIGS. 10a-10d illustrate top, back, top perspective and partial top perspective views, respectively, of an exemplary embodiment of an outer leaf assembly.

FIGS. 11a-11m illustrate side, top, top perspective, detail, detail, partial front, side, partial top, partial top, partial front, side, partial top and partial top views, respectively, of an exemplary embodiment of an outer leaf.

FIGS. 12a and 12b illustrate top and perspective views, respectively, of an exemplary embodiment of an outer leaf rail.

FIGS. 13a-13e illustrate front, back perspective, top, back and front perspective views, respectively, of an exemplary embodiment of a rear support.

TERMS OF ART

Figure 2C:
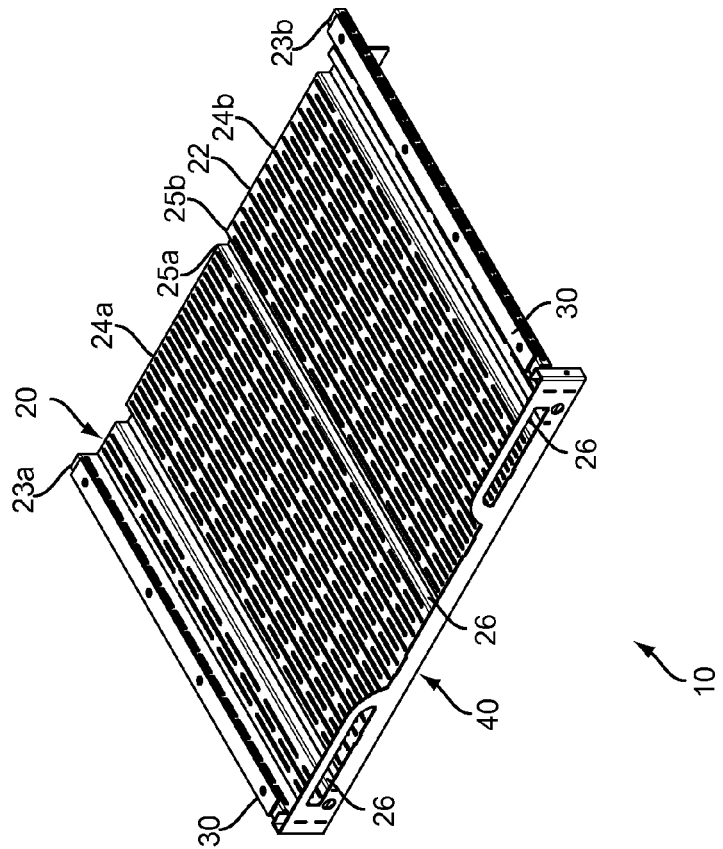
Figure 2B:
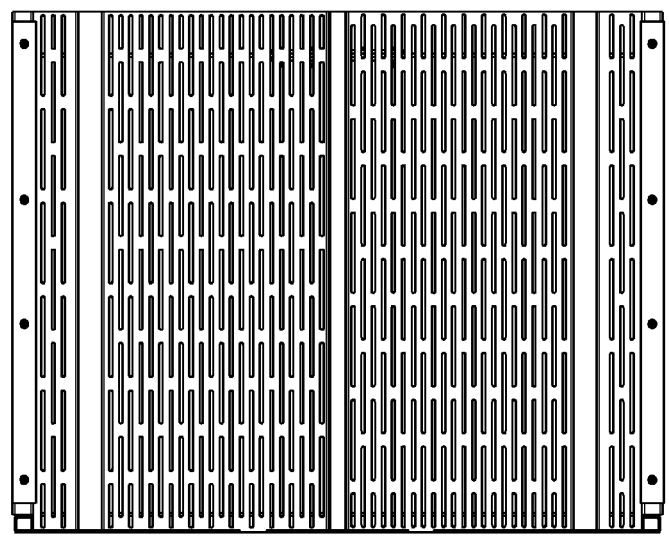
Figure 2A:
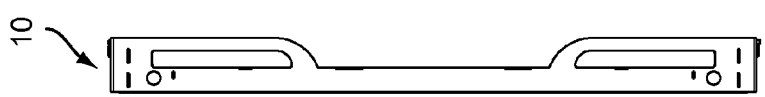

As used herein, the term "fastening aperture" means an aperture in a component that is capable of receiving a fastener.

As used herein, the term "leaf" means a substantially planar panel.

DETAILED DESCRIPTION OF THE INVENTION

FIGS. 1a-1c illustrate perspective and enlarged views of an exemplary embodiment of a secondary truck bed system 200. Secondary truck bed system 200 includes an inner leaf assembly 10, an outer leaf assembly 70 and a plurality of legs 110. Inner leaf assembly 10 telescopes into and out of outer leaf assembly 70 to adjust the overall length of secondary truck bed system 200. Fasteners 120 removably passing through fastening apertures 130 in inner leaf assembly 10 and outer leaf assembly 70 prevent accidental expansion or retraction. Inner leaf assembly 10 and outer leaf assembly 70 slide up and down legs 110 to adjust the height of inner leaf assembly 10 and outer leaf assembly 70. Fasteners 120 passing through fastening apertures 130 in inner leaf assembly 10, outer leaf assembly 70 and legs 110 maintain the selected height. Fasteners 120 may be threaded or unthreaded pins, dowels, bolts or screws. Fastening apertures 130 may be circular or elongated.

Various embodiments of secondary truck bed system 200 have length ranging from a maximum fully extended length of approximately 10 feet to a minimum fully contracted length of approximately one foot. Elements of secondary truck bed system 200 may comprise materials such as, but not limited to, aluminum, steel, fiberglass, polymers, metal, wood, composite or any combination thereof. Components of secondary truck bed system 200 attach by means of fasteners 120 and fastener apertures 130, adhesives, welding, soldering or any other attachment means known in the art.

Secondary truck bed system 200 is secured to a truck structure by at least four removable tie-downs 140, which connect secondary truck bed system 200 to tie-down points in the truck bed. Because secondary truck bed system 200 is not bolted to the truck structure, it is easily removed from the truck. Once removed, secondary truck bed system 200 can be placed in another truck or used for another purpose, such as a table, bench or sleeping platform. The term truck may include other vehicles, such as, but not limited to, vans, sport utility vehicles or trailers.

Certain embodiments may also include a manual crank or electric motor connected to the appropriate section of secondary truck bed system 200 for adjusting the overall length of secondary truck bed system 200 and/or the height of inner leaf assembly 10 and outer leaf assembly 70. Certain embodiments of secondary truck bed system 200 may also include optional removable deck dividers 150 that can be set in different locations on inner leaf assembly 10 and/or outer leaf assembly 70 to hold items from sliding around.

FIGS. 2a-2g illustrate front, top, top perspective, bottom, bottom perspective and enlarged views, respectively, of an exemplary embodiment of inner leaf assembly 10. Inner leaf assembly 10 includes inner leaf 20 having an inner leaf front edge 21, an inner leaf back edge 22, two inner leaf lateral edges 23a and 23b, two inner leaf segments 24a and 24b, two inner leaf segment edges 25a and 25b and optional stabilization channels 26. Inner leaf assembly 10 also includes a plurality of inner leaf rails 30, a front support 40, at least one inner leaf cross member 50 and at least one inner leaf support 60.

In the exemplary embodiment, inner leaf rails 30 attach to the top of inner leaf lateral edges 23a and 23b. In other embodiments, inner leaf rails 30 may attach to the bottom of inner leaf lateral edges 23a and 23b. Front support 40 attaches to inner leaf front edge 21. Inner leaf cross member 50 extends across the bottom of inner leaf 20, between inner leaf lateral edges 23a and 23b. Optionally, inner leaf support 60 attaches to a medial section of inner leaf cross member 50. This configuration provides reinforcement for increased durability and load capacity. In the exemplary embodiment, the medial section of inner leaf cross member 50 is sandwiched between two inner leaf supports 60.

FIGS. 3a-3j illustrate side, top, top perspective, partial top perspective, side, partial top, partial front, side, partial top and partial front views, respectively, of an exemplary embodiment of inner leaf 20. In the exemplary embodiment, inner leaf 20 is made up of two inner leaf segments 24a and 24b connected along inner leaf segment edges 25a and 25b by fasteners 120 passing through fastening apertures 130. Together, inner leaf segment edges 25a and 25b make up a stabilization channel 26. While the exemplary embodiment includes three stabilization channels 26, other embodiments may include between zero and seven stabilization channels 26 extending longitudinally along to upper surface of inner leaf 20.

Alternate embodiments may utilize an integrated inner leaf 20 without segments or segment edges. While inner leaf segments 24a and 24b have a pierced grating configuration, other embodiments of inner leaf segments 24a and 24b have a substantially solid construction.

Figure 3H:
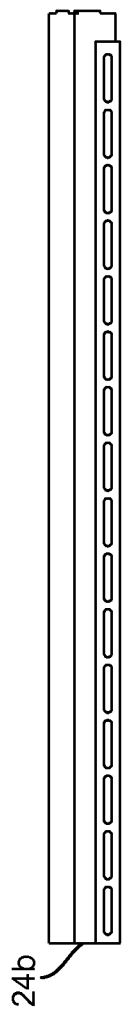
Figure 3I:
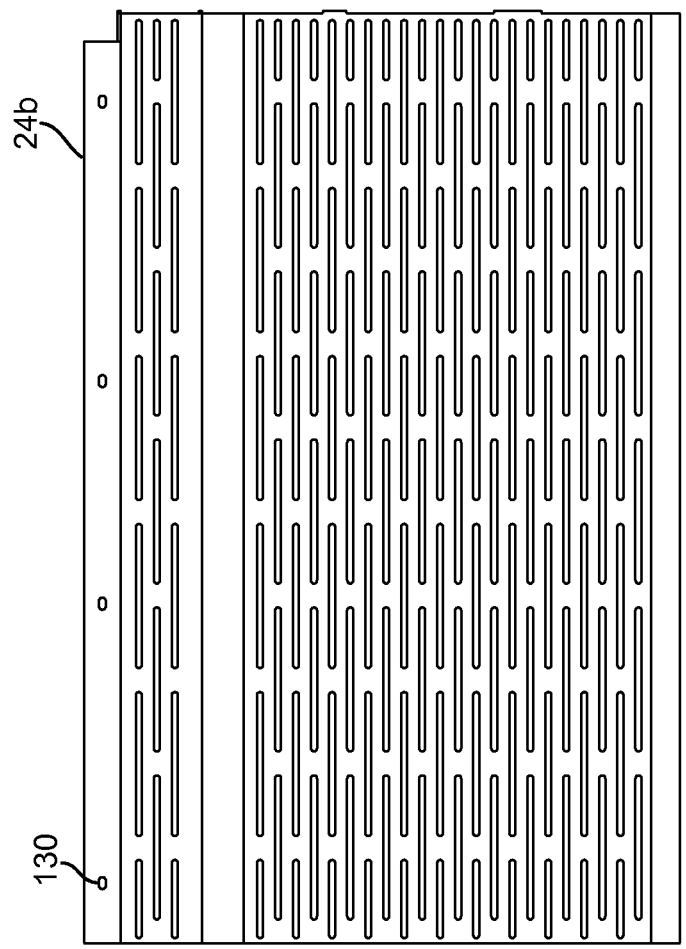
Figure 3J:
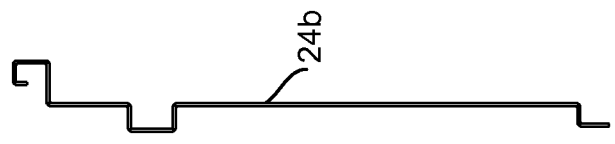

In the exemplary embodiment illustrated in FIGS. 3g and 3j, inner leaf lateral edges 23a and 23b have a substantially P-shaped cross-sectional configuration. Inner leaf rails 30 attach to the top outer surface of inner leaf lateral edges 23a and 23b by means of fasteners 120 passing through fastening apertures 130. Part of inner leaf cross member 50 extends along the upright segment and into the open throat of the P-shaped cross-section for increased stability and support.

In other embodiments, inner leaf lateral edges 23a and 23b have a substantially flat configuration and slide along outer leaf assembly 70.

Figure 4A:
FIGS. 4a and 4b illustrate top and perspective views, respectively, of an exemplary embodiment of an inner leaf rail.
Figure 4B:
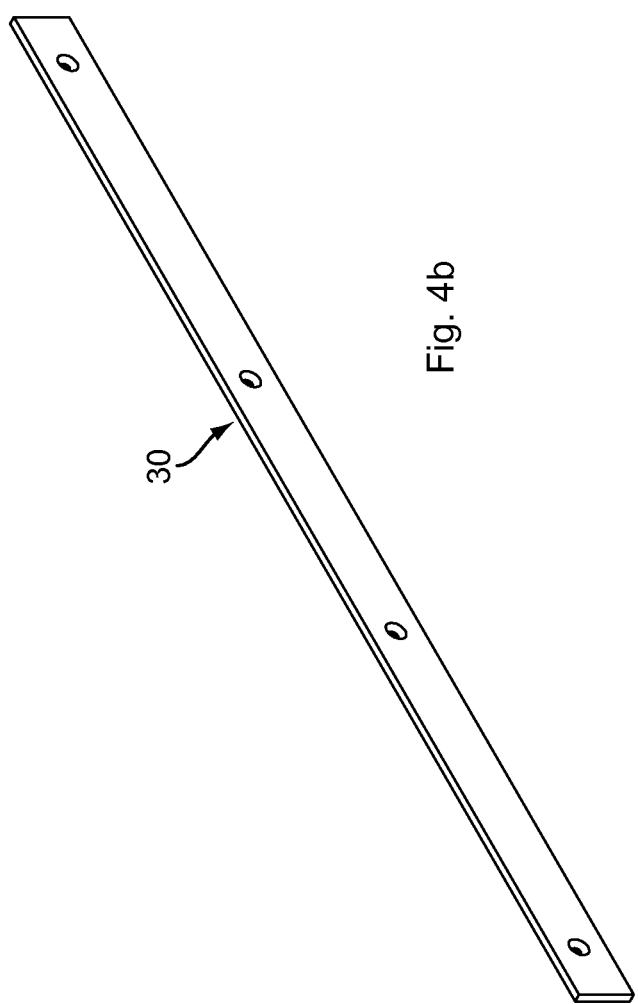

FIGS. 4a and 4b illustrate top and perspective views, respectively, of an exemplary embodiment of inner leaf rail 30. In the exemplary embodiment, inner leaf rail 30 is a polymer bar attached to the top of inner leaf lateral edges 23a and 23b. Polymer used to manufacture inner leaf rail 30 includes, but is not limited to, ultrahigh molecular weight polyethylene (UHMWPE). In other embodiments, inner leaf rail 30 may include rotating elements such as, but not limited to, rollers, wheels, or bearings.

FIGS. 5a-5d illustrate front, back perspective, top, front perspective and enlarged views, respectively, of an exemplary embodiment of front support 40. Front support 40 includes front leg channels 41a and 41b, and at least one support handle 42. Front leg channels 41a and 41b are substantially C-shaped channels located on the outermost lateral edges of front support 40. Each of front leg channels 41a and 41b includes at least one fastening aperture 130 to allow fasteners 120 to pass through fastening apertures 130 in legs 110. In the exemplary embodiment, a front support tab 45 closes each of front leg channels 41a and 41b. Support handle 42 extends above front support 40 to provide an easily gripped handle for manipulating secondary truck bed system 200.

Figure 6A:
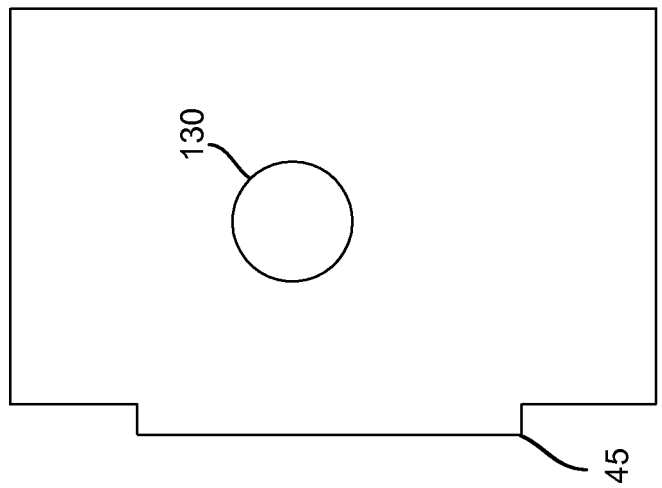
FIGS. 6a and 6b illustrate front and perspective views, respectively, of an exemplary embodiment of a front support tab.
Figure 6B:
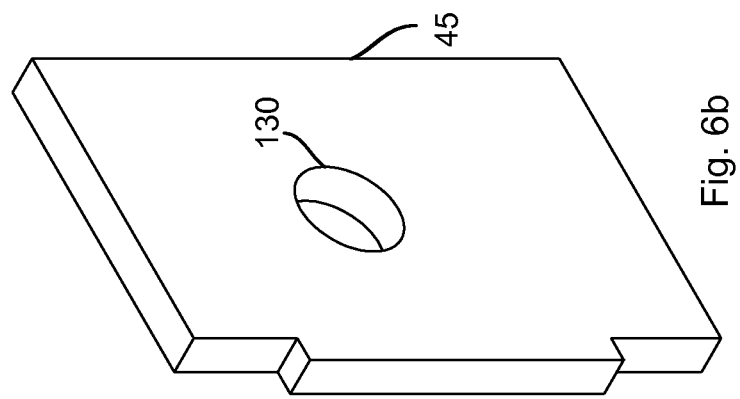

FIGS. 6a and 6b illustrate front and perspective views, respectively, of an exemplary embodiment of front support tab 45. Front support tabs 45 include a fastening aperture 130 to allow fasteners 120 to pass through fastening apertures 130 in legs 110.

FIGS. 7a and 7b illustrate front and perspective views, respectively, of an exemplary embodiment of inner leaf cross member 50. Inner leaf cross member 50 extends across the bottom of inner leaf 20, between inner leaf lateral edges 23a and 23b. Optional cross cutaways 51 accommodate embodiments of secondary truck bed system 200 utilizing stabilization channels 26. Optionally, at least one inner leaf support 60 attaches to a medial section of inner leaf cross member 50 by means of fasteners 120 passing through fastening apertures 130.

Figure 8A:
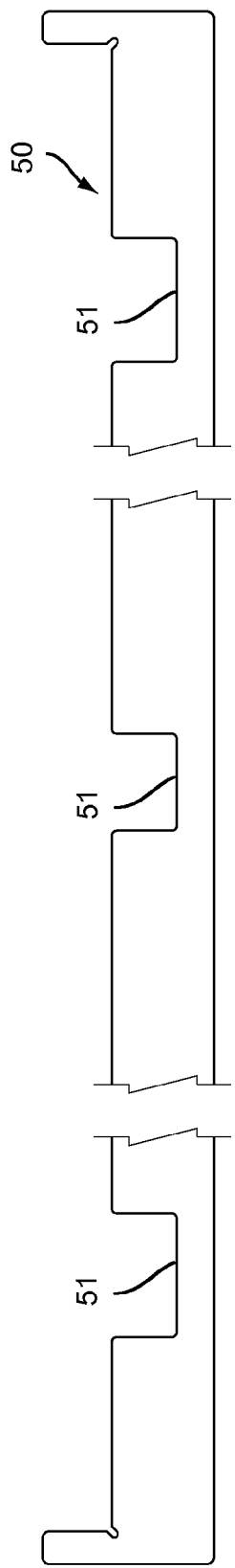
FIGS. 8a and 8b illustrate front and perspective views, respectively, of another embodiment of an inner leaf cross member.
Figure 8B:
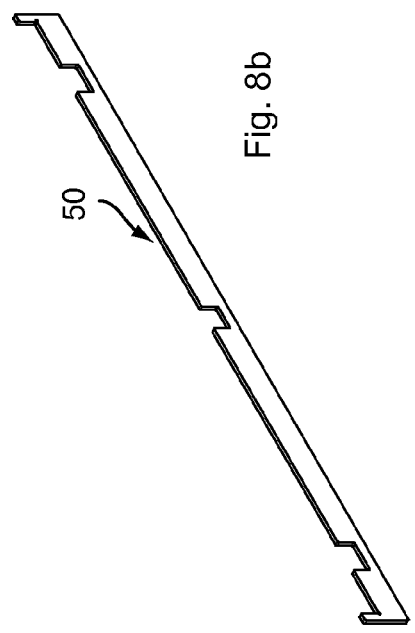

FIGS. 8a and 8b illustrate front and perspective views, respectively, of another embodiment of inner leaf cross member 50. This embodiment is substantially identical to the exemplary embodiment of FIGS. 7a and 7b, but does not include fastening apertures 130.

Figure 9A:
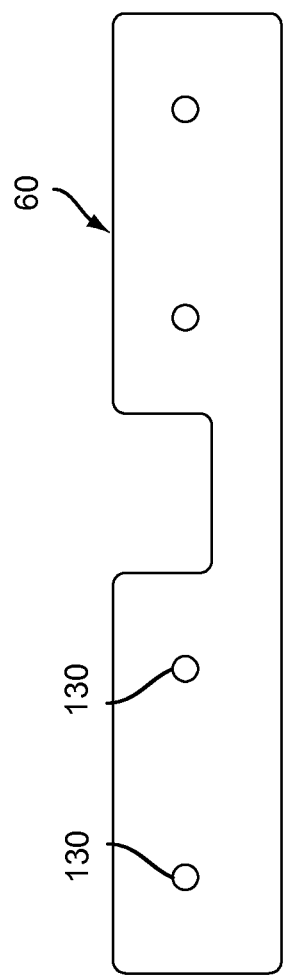
FIGS. 9a and 9b illustrate front and perspective views, respectively, of an exemplary embodiment of an inner leaf support.
Figure 9B:
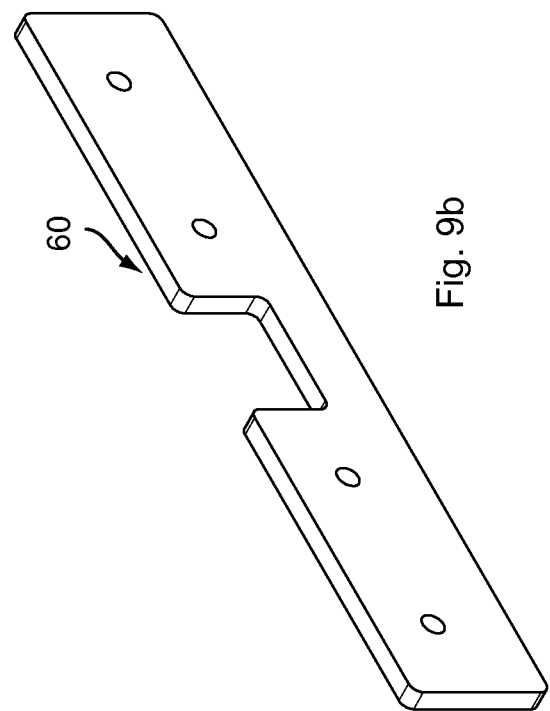
Figure 11I:
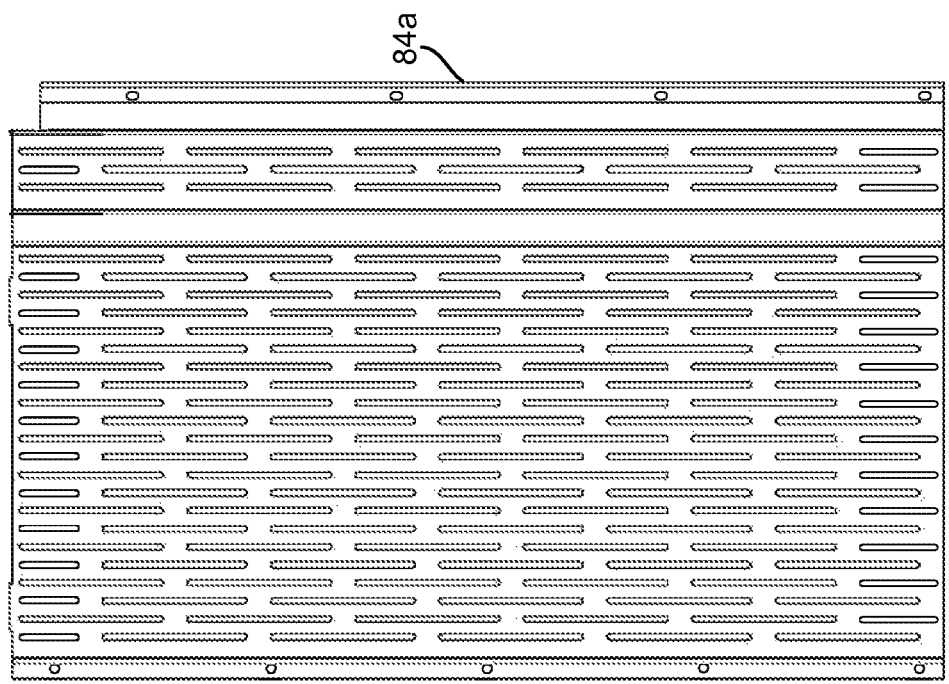
Figure 11M:
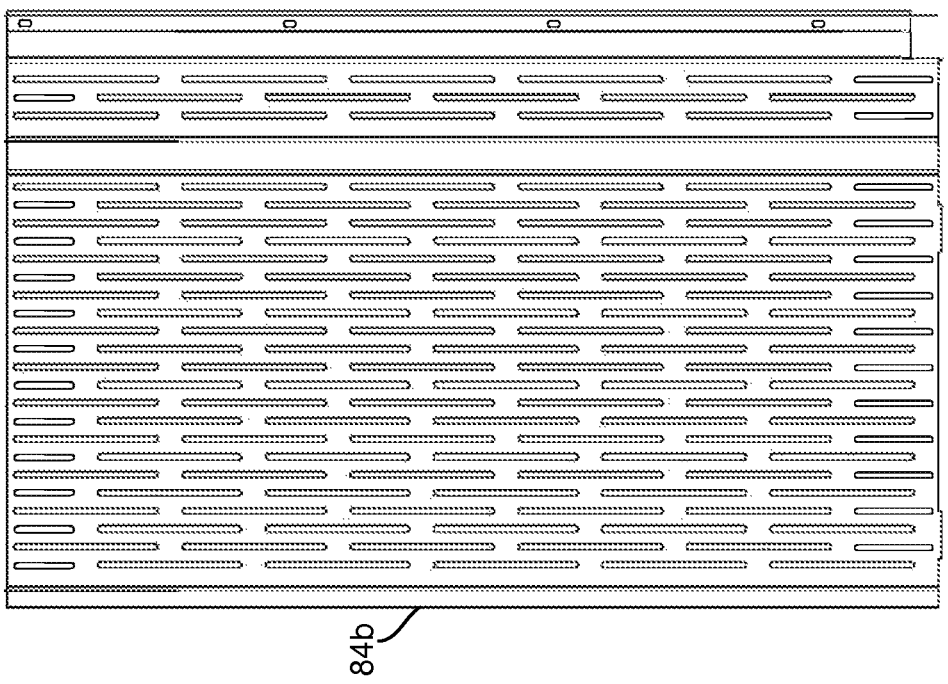
Figure 13C:
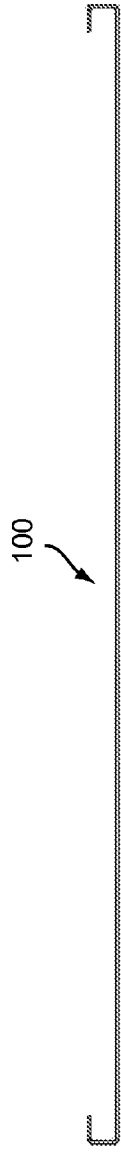
Figure 13D:
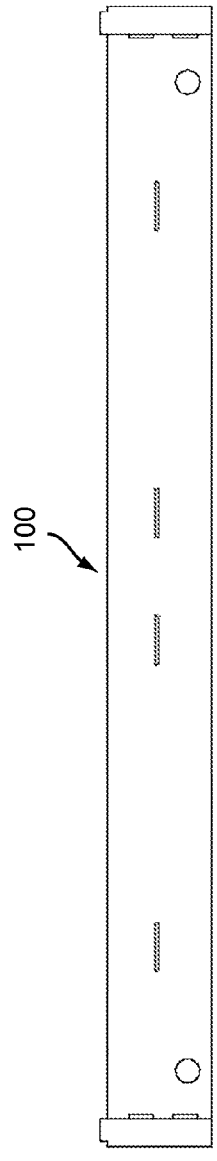
Figure 13E:
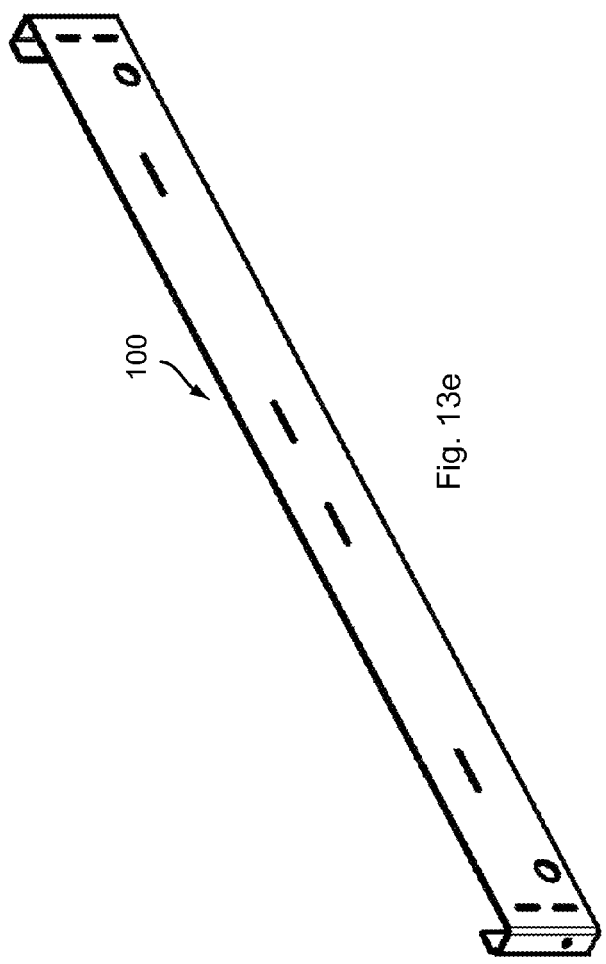

FIGS. 9a and 9b illustrate front and perspective views, respectively, of an exemplary embodiment of inner leaf support 60. Optionally, at least one inner leaf support 60 attaches to a medial section of inner leaf cross member 50 by means of fasteners 120 passing through fastening apertures 130. This configuration provides reinforcement for increased durability and load capacity. In certain embodiments, the medial section of inner leaf cross member 50 is sandwiched between two inner leaf supports 60 for even more durability and load capacity.

FIGS. 10a-10d illustrate top, back, top perspective and partial top perspective views, respectively, of an exemplary embodiment of outer leaf assembly 70. Outer leaf assembly 70 includes an outer leaf 80 having an outer leaf front edge 81, outer leaf back edge 82, two outer leaf lateral edges 83a and 83b, two optional outer leaf segments 84a and 84b, two optional outer leaf segment edges 85a and 85b, at least one optional stabilization projection 86 and optional outer leaf lip 87. Outer leaf assembly 70 also includes two outer leaf rails 90 and a rear support 100.

In the exemplary embodiment, outer leaf rails 90 attach to the bottom inner surface of outer leaf lateral edges 83a and 83b by means of fasteners 120 passing through fastening apertures 130. In other embodiments, outer leaf rails 90 attach to an upper or bottom surface of outer leaf lateral edges 83a and 83b by means of fasteners 120 passing through fastening apertures 130. Rear support 100 attaches to outer leaf back edge 82.

FIGS. 11a-11m illustrate side, top, top perspective, detail, detail, partial front, side, partial top, partial top, partial front, side, partial top and partial top views, respectively, of an exemplary embodiment of outer leaf 80. In the exemplary embodiment, outer leaf 80 is made up of two outer leaf segments 84a and 84b connected along outer leaf segment edges 85a and 85b by fasteners 130 passing through fastening apertures 130. Together, outer leaf segment edges 85a and 85b make up a stabilization projection 86. When secondary truck bed system 200 is assembled, stabilization projection 86 is slidably received by stabilization channel 26. While the exemplary embodiment includes three stabilization projections 86, other embodiments may include between zero and seven stabilization projections 86 extending longitudinally along the lower surface of outer leaf 80.

Alternate embodiments may utilize an integrated outer leaf 80 without segments or segment edges. While outer leaf segments 84a and 84b have a pierced grating configuration, other embodiments of outer leaf segments 84a and 84b have a substantially solid construction. Certain embodiments of outer leaf 80 include optional outer leaf lip 87 extending between an upper surface of outer leaf 80 and an upper surface of inner leaf 20. Outer leaf lip 87 descends at an angle of approximately 20 degrees to approximately 60 degrees to provide a smooth incline between outer leaf 80 and inner leaf 20.

As illustrated in the exemplary embodiment of FIGS. 11f and 11j, outer leaf lateral edges 83a and 83b have a partially open rectangular cross-sectional configuration. Outer leaf lateral edges 83a and 83b slidably receive inner leaf lateral edges 23a and 23b. In the exemplary embodiment, inner leaf lateral edges 23a and 23b nest within outer leaf lateral edges 83a and 83b. Outer leaf rails 90 attach to the bottom inner surfaces of outer leaf lateral edges 83a and 83b by means of fasteners 120 passing through fastening apertures 130.

In alternate embodiments, both outer leaf lateral edges 83a and 83b and inner leaf lateral edges 23a and 23b have a substantially flat configuration. In such configurations, inner leaf lateral edges 23a and 23b are supported by and slide along outer leaf lateral edges 83a and 83b. Fasteners 120 through fastening apertures 130 in both outer leaf lateral edges 83a and 83b and inner leaf lateral edges 23a and 23b maintain secondary truck bed system 200 at a desired length.

FIGS. 12a and 12b illustrate top and perspective views, respectively, of an exemplary embodiment of outer leaf rail 90. In the exemplary embodiment, outer leaf rail 90 is a polymer bar attached to the bottom inner surface of outer leaf lateral edges 83a and 83b by means of fasteners 120 passing through fastening apertures 130. Polymer used to manufacture outer leaf rail 90 includes, but is not limited to UHMWPE. In other embodiments, outer leaf rail 90 may include rotating elements such as, but not limited to, rollers, wheels, or bearings.

FIGS. 13a-13e illustrate front, back perspective, top, back and front perspective views, respectively, of an exemplary embodiment of rear support 100. Rear support 100 includes rear leg channels 101a and 101b. Rear leg channels 101a and 101b are substantially C-shaped channels located on the outermost lateral edges of rear support 100. Each of rear leg channels 101a and 101b is includes at least one fastening aperture 130 to allow fasteners 120 to pass through fastening apertures 130 in legs 110. In the exemplary embodiment, a rear support tab 105 closes each of rear leg channels 101a and 101b.

Figure 14A:
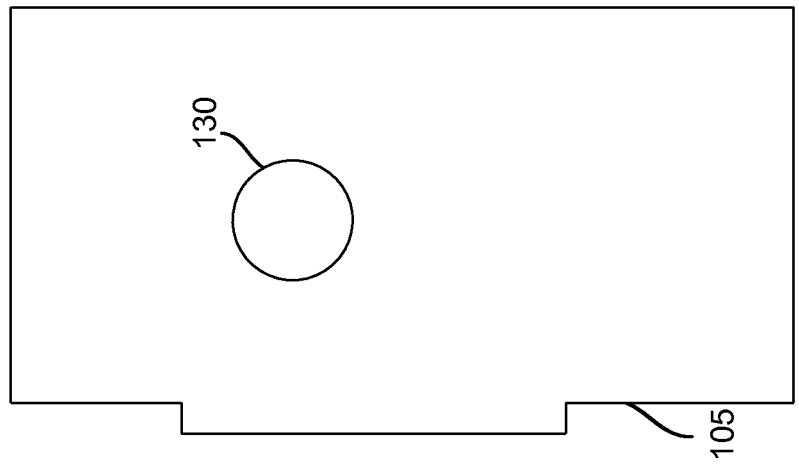
FIGS. 14a and 14b illustrate front and perspective views, respectively, of an exemplary embodiment of a rear support tab.
Figure 14B:
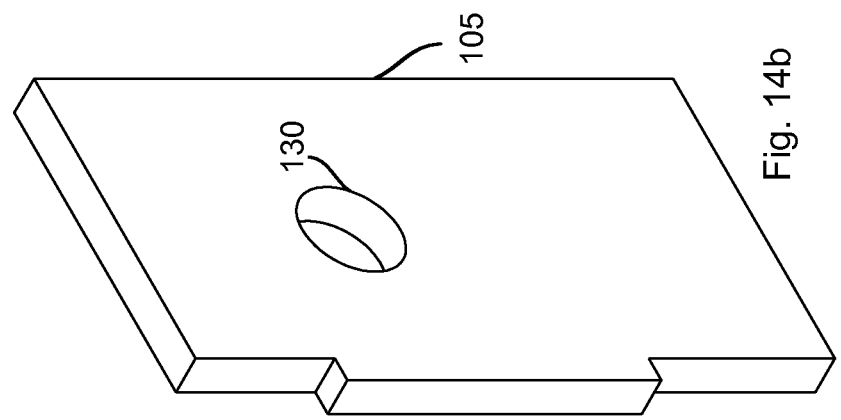

FIGS. 14a and 14b illustrate front and perspective views, respectively, of an exemplary embodiment of rear support tab 105. Rear support tabs 105 include a fastening aperture 130 to allow fasteners 120 to pass through fastening apertures 130 in legs 110.

Figure 15C:
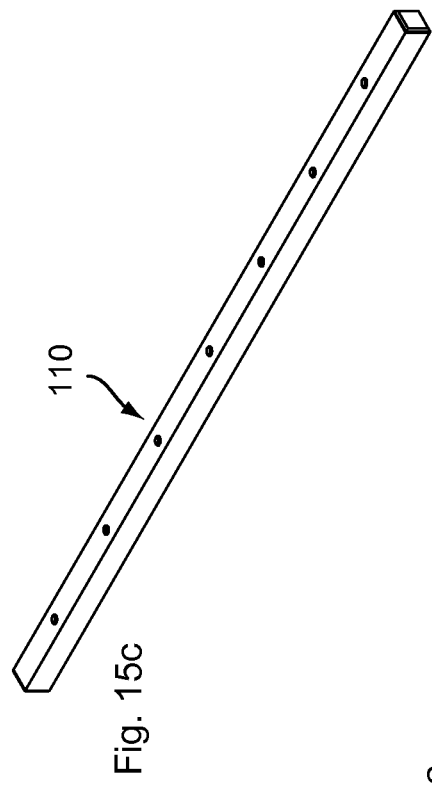
FIGS. 15a-15c illustrate right side, left side and perspective views, respectively, of an exemplary embodiment of a leg.
Figure 15A:
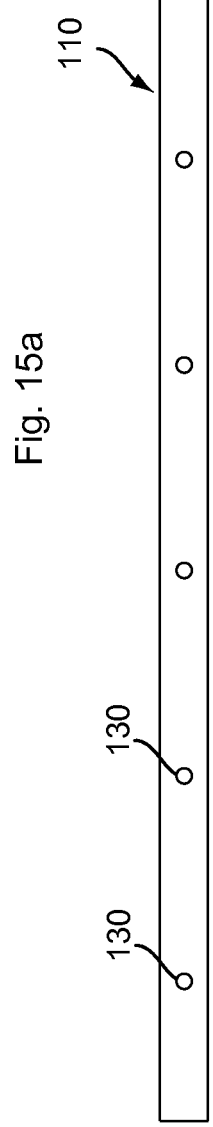
Figure 15B:
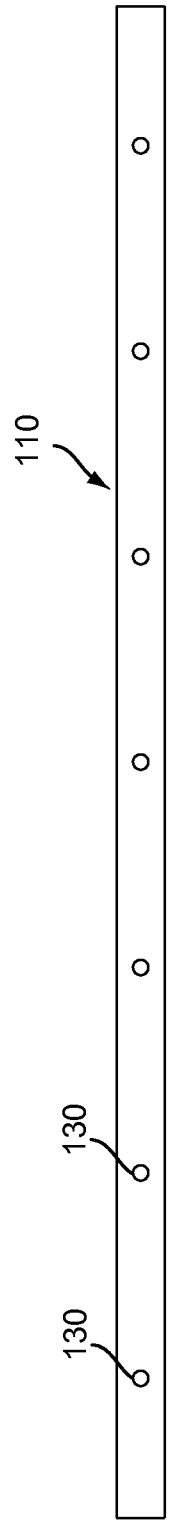

FIGS. 15a-15c illustrate right side, left side and perspective views, respectively, of an exemplary embodiment of leg 110. Leg 110 has a maximum length of approximately 120 inches and a minimum length of approximately 4 inches. While the exemplary embodiment shows seven pairs of fastening apertures 130 spaced apart approximately 4.3 inches in leg 110, other embodiments may include approximately two pairs of fastening apertures 130 to approximately 120 pairs of fastening apertures 130 spaced apart approximately one inch to approximately twelve inches.

Legs 110 can be removed completely to lower inner leaf assembly 10 and outer leaf assembly 70 to the ground, or to allow disassembly for easier shipping. Certain embodiments of legs 110 may include permanent or removable wheels, such as, but not limited to, casters, to enable easy movement of secondary truck bed system 200.

It will be understood that many additional changes in the details, materials, procedures and arrangement of parts, which have been herein described and illustrated to explain the nature of the invention, may be made by those skilled in the art within the principle and scope of the invention as expressed in the appended claims. Moreover, the terms "substantially" or "approximately" as used herein may be applied to modify any quantitative representation that could permissibly vary without resulting in a change in the basic function to which it is related.

It should be further understood that the drawings are not necessarily to scale; instead, emphasis has been placed upon illustrating the principles of the invention. Furthermore, not all instances of a part are labeled, particularly for multiple identical parts.

What is claimed is:

1. A secondary truck bed system comprising:
   an inner leaf assembly, comprising:
      an inner leaf comprising an inner leaf front edge, an inner leaf back edge and a plurality of inner leaf lateral edges, wherein each of said inner leaf lateral edges comprises at least one fastening aperture,
      a plurality of inner leaf rails connected to said plurality of inner leaf lateral edges,
      a front support connected to said inner leaf front edge, said front support comprising a plurality of front leg channels, wherein each of said front leg channels comprises at least one fastening aperture;
   an outer leaf assembly, comprising:
      an outer leaf comprising an outer leaf front edge, an outer leaf back edge and a plurality of outer leaf lateral edges, wherein each of said outer leaf lateral edges comprises at least one fastening aperture,
      a plurality of outer leaf rails connected to said plurality of outer leaf lateral edges,
      a rear support connected to said outer leaf back edge, said rear support comprising a plurality of rear leg channels, wherein each of said rear leg channels comprises at least one fastening aperture; and
   a plurality of legs, each of said plurality of legs comprising a plurality of paired fastening apertures; and
   a plurality of removable fasteners,
   wherein said plurality of outer leaf lateral edges are slidably connected to said plurality of inner leaf lateral edges,
   wherein at least one of said plurality of removable fasteners extends through said at least one fastening aperture in said plurality of inner leaf lateral edges and through said at least one fastening aperture in said plurality of outer leaf lateral edges,
   wherein each of said plurality of front leg channels are slidably connected to one of said plurality of legs,
   wherein each of said plurality of rear leg channels are slidably connected to one of said plurality of legs,
   wherein at least one of said plurality of removable fasteners extends through said at least one fastening aperture in each of said plurality of front leg channels and through two of said plurality of paired fastening apertures in one of said plurality of legs,
   wherein at least one of said plurality of removable fasteners extends through said at least one fastening aperture in each of said plurality of front leg channels and through two of said plurality of paired fastening apertures in one of said plurality of legs.

2. The system of claim 1, wherein said inner leaf assembly further comprises at least one inner leaf cross member extending between said plurality of inner leaf lateral edges along a lower surface of said inner leaf.

3. The system of claim 2, wherein said inner leaf assembly further comprises at least one inner leaf support extending along a lower surface of said inner leaf and connected to said at least one inner leaf cross member.

4. The system of claim 1, wherein said inner leaf lateral edges and said outer leaf lateral edges have a substantially flat configuration, wherein said inner leaf lateral edges slidably rest upon said outer leaf lateral edges.

5. The system of claim 1, wherein said inner leaf lateral edges have a substantially P-shaped cross-sectional configuration, wherein said outer leaf lateral edges have a partially open rectangular cross-sectional configuration, wherein said inner leaf lateral edges are substantially nested within said outer leaf lateral edges.

6. The system of claim 1, wherein each of said plurality of inner leaf rails comprises a polymer bar connected to a surface of one of said inner leaf lateral edges.

7. The system of claim 1, wherein each of said plurality of outer leaf rails comprises a polymer bar connected to a surface of one of said outer leaf lateral edges.

8. The system of claim 1, wherein at least one of said plurality of inner leaf rails or at least one of said plurality of outer leaf rails comprises rotating elements selected from the group consisting of: wheels, bearings and rollers.

9. The system of claim 1, wherein said removable fastener is selected from the group consisting of: threaded or unthreaded pins, dowels, bolts and screws.

10. The system of claim 1, wherein said plurality of paired fastening apertures number between two pairs and approximately 120 pairs of fastening apertures, wherein said plurality of paired fastening apertures are spaced apart approximately one inch to approximately twelve inches.

11. The system of claim 1, wherein said inner leaf further comprises a plurality of inner leaf segments, wherein each of said plurality of inner leaf segments comprises an inner leaf segment edge, wherein each of said inner leaf segment edges is connected to another of said inner leaf segment edges.

12. The system of claim 1, wherein said outer leaf further comprises a plurality of outer leaf segments, wherein each of said plurality of outer leaf segments comprises an outer leaf segment edge, wherein each of said outer leaf segment edges is connected to another of said outer leaf segment edges.

13. The system of claim 1, wherein said inner leaf further comprises at least one stabilization channel, wherein said outer leaf comprises at least one stabilization projection, wherein said at least one stabilization projection is slidably received within said at least one stabilization channel.

14. The system of claim 1, wherein said outer leaf further comprises an outer leaf lip extending between an upper surface of said outer leaf and an upper surface of said inner leaf, wherein said outer leaf lip descends at an angle ranging from approximately 20 degrees to approximately 60 degrees.

15. The system of claim 1, wherein said front support further comprises a plurality of front support tabs connected to said front leg channels.

16. The system of claim 1, wherein said front support further comprises a support handle extending from said front support.

17. The system of claim 1, wherein said rear support further comprises a plurality of rear support tabs connected to said rear leg channels.

18. The system of claim 1, further comprising a plurality of removable tie-downs connecting said system to a truck.

19. The system of claim 1, further comprising at least one removable deck divider connected to at least one of said inner leaf and said outer leaf.

20. The system of claim 1, having a maximum fully extended length of approximately 10 feet and a minimum fully contracted length of approximately one foot.

* * * * *